(12) United States Patent
Butterworth

(10) Patent No.: US 8,259,057 B2
(45) Date of Patent: Sep. 4, 2012

(54) LIQUID CRYSTAL DISPLAY

(75) Inventor: Mark Butterworth, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1435 days.

(21) Appl. No.: 11/888,004

(22) Filed: Jul. 31, 2007

(65) Prior Publication Data

US 2009/0033613 A1 Feb. 5, 2009

(51) Int. Cl.
G09G 3/36 (2006.01)

(52) U.S. Cl. ............................ 345/102; 345/87; 345/101

(58) Field of Classification Search ................... 345/87, 345/101, 102; 349/61
See application file for complete search history.

(56) References Cited

U.S. PATENT DOCUMENTS

| | | | | |
|---|---|---|---|---|
| 6,127,783 | A * | 10/2000 | Pashley et al. ............... | 315/149 |
| 6,495,964 | B1 * | 12/2002 | Muthu et al. ................. | 315/149 |
| 6,611,249 | B1 * | 8/2003 | Evanicky et al. ............ | 345/102 |
| 6,633,301 | B1 | 10/2003 | Dallas et al. | |
| 7,071,908 | B2 * | 7/2006 | Guttag et al. .................. | 345/87 |
| 7,408,557 | B2 * | 8/2008 | Ko et al. ...................... | 345/590 |
| 7,542,056 | B2 * | 6/2009 | Oh .............................. | 345/690 |
| 7,759,882 | B2 * | 7/2010 | Korcharz et al. ............ | 315/312 |
| 7,884,832 | B2 * | 2/2011 | Alessi et al. ................. | 345/589 |
| 7,889,235 | B2 * | 2/2011 | Urisu .......................... | 348/191 |
| 7,893,916 | B2 * | 2/2011 | Wei ............................ | 345/102 |
| 2002/0057238 | A1 * | 5/2002 | Nitta et al. .................... | 345/87 |
| 2007/0063961 | A1 * | 3/2007 | Kuroki ......................... | 345/102 |
| 2007/0097045 | A1 * | 5/2007 | Lee et al. ...................... | 345/82 |
| 2007/0120496 | A1 * | 5/2007 | Shimizu et al. ............. | 315/169.3 |
| 2007/0182700 | A1 * | 8/2007 | Baba et al. ................... | 345/102 |
| 2007/0247414 | A1 * | 10/2007 | Roberts ........................ | 345/102 |
| 2008/0165116 | A1 * | 7/2008 | Herz et al. ................... | 345/102 |

FOREIGN PATENT DOCUMENTS

| | | |
|---|---|---|
| CN | 1291282 A | 4/2001 |
| CN | 1945405 A | 4/2007 |
| JP | 2006-019263 | 1/2006 |
| JP | 2006-119268 | 5/2006 |
| KR | 2007-0045735 | 5/2007 |
| KR | 2008-0056618 | 6/2008 |

OTHER PUBLICATIONS

State Intellectual Property Office, P.R. China. Second Office Action. Date of Issue Dec. 7, 2011. Patent Application No. 200880101373.0.
International Search Report and the Written Opinion, dated Jan. 30, 2009, 11 pages.
Chinese. Office Action, Chinese Patent Application No. 200880101373.0, Date of Issuance: May 18, 2011, pp. 1-4.

* cited by examiner

Primary Examiner — Joe H Cheng

(57) ABSTRACT

In one embodiment, a liquid crystal display assembly comprises a liquid crystal module, a backlight assembly comprising an array of light emitting diodes, a detector to detect an optical output of at least one light emitting diode, and a controller coupled to the detector wherein the controller comprises logic to record in a memory location a first output value from the detector at a first point in time for a plurality of light emitting diodes in the array of light emitting diodes, measure a second output value from the detector at a second point in time for the plurality of light emitting diodes in the array of light emitting diodes, and adjust at least one input value to the plurality of light emitting diodes based on a relationship between the first output value and the second output value.

20 Claims, 5 Drawing Sheets

| LED | $V(T_0)$ | $VD(T_0)$ | $VD(T_R)$ |
|---|---|---|---|
| 0,0 | 4.247 | 2.515 | 2.614 |
| 0,1 | 4.198 | 2.275 | 2.385 |
| 0,2 | 4.201 | 2.407 | 2.201 |
| 0,3 | 4.217 | 2.491 | 2.491 |
| ⋮ | ⋮ | ⋮ | ⋮ |
| 0,n | 4.314 | 2.385 | 2.633 |
| 1,0 | 4.165 | 2.222 | 2.422 |
| 1,1 | 4.220 | 2.305 | 2.218 |
| 1,2 | 4.212 | 2.642 | 2.743 |
| 1,3 | 4.275 | 2.849 | 2.753 |
| ⋮ | ⋮ | ⋮ | ⋮ |
| 1,n | 4.200 | 2.741 | 2.845 |
| 2,0 | 4.205 | 2.671 | 2.784 |
| 2,1 | 4.197 | 2.754 | 2.912 |
| 2,2 | 4.250 | 2.515 | 2.752 |
| 2,3 | 4.210 | 2.495 | 2.624 |
| ⋮ | ⋮ | ⋮ | ⋮ |
| 2,n | 4.221 | 2.284 | 2.334 |
| ⋮ | ⋮ | ⋮ | ⋮ |
| m,0 | 4.215 | 2.754 | 2.904 |
| m,1 | 4.255 | 2.642 | 2.842 |
| m,2 | 4.250 | 2.592 | 2.394 |
| m,3 | 4.217 | 2.682 | 2.712 |
| ⋮ | ⋮ | ⋮ | ⋮ |
| m,n | 4.219 | 2.456 | 2.693 |

LIQUID CRYSTAL DISPLAY

BACKGROUND

Many electronic devices include color liquid crystal displays (LCDs). Some LCDs utilize a white backlight, which is passed through at least one color filter to make different colors available to the LCD screen. In some devices, pixels on the LCD screen are assigned to groups of three, which include a red pixel, a green pixel, and a blue pixel. By managing the intensity of the red, green, and blue pixels, a range of colors are presented on the screen.

LCD displays may utilize arrays of light emitting diodes (LEDs) as an illumination source. The output of an LED may vary as a function of multiple factors including age of the LED and the operating temperature of the LED. Such variation can cause the output quality of a display to degrade over time.

BRIEF DESCRIPTION OF THE DRAWINGS

FIG. 4 is a schematic illustration of a data table, according to embodiments.

DETAILED DESCRIPTION

Figure 1B:
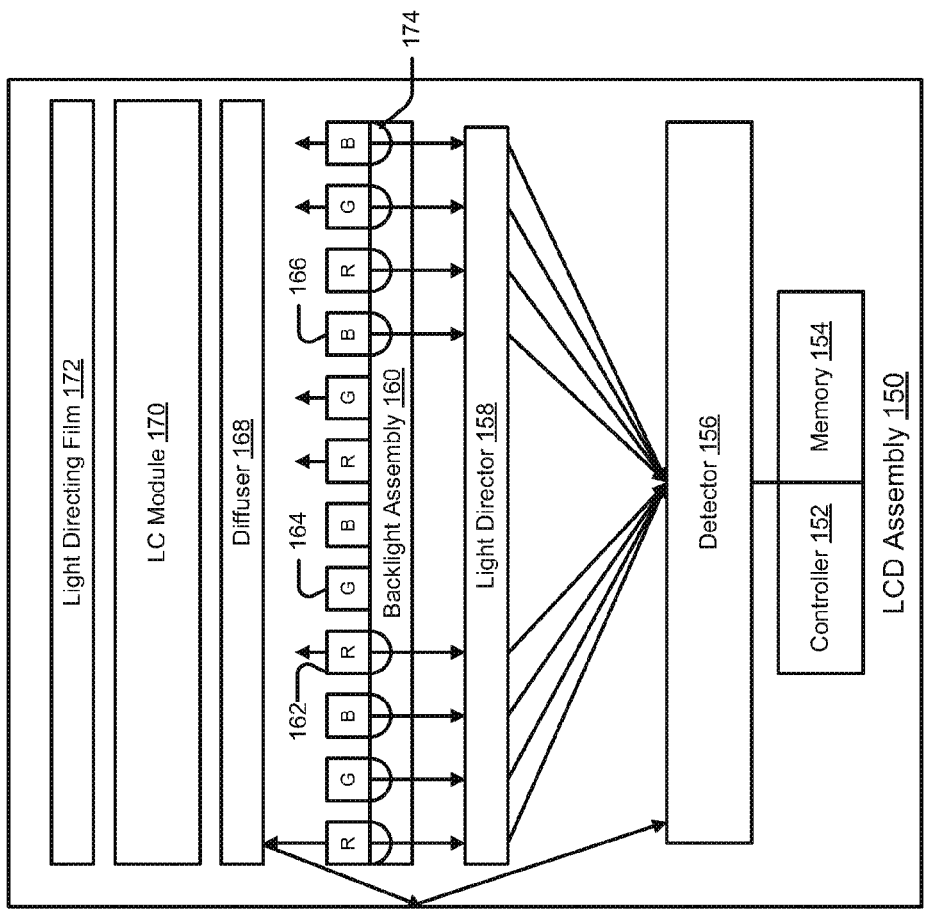
FIG. 1B is an exploded, side view of a display assembly, according to an embodiment.
Figure 1A:
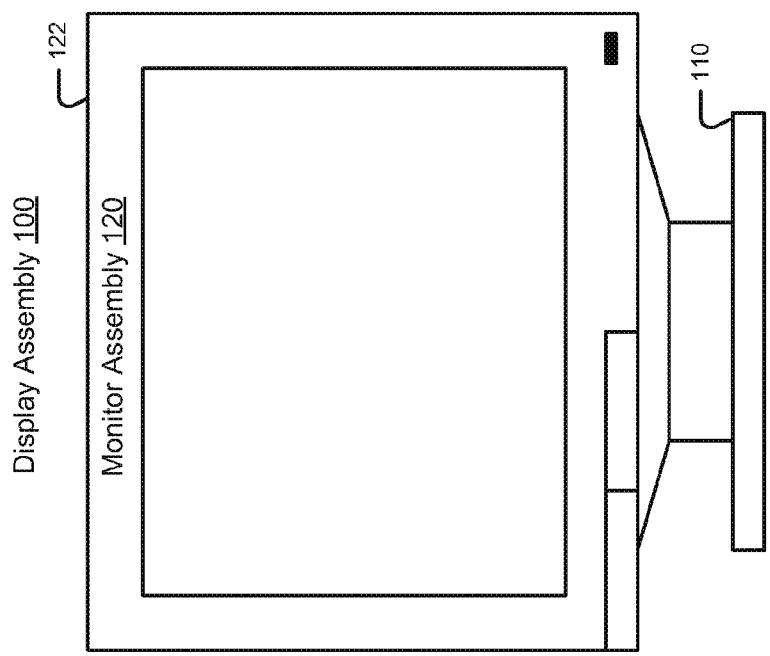
FIG. 1A is a schematic, front view of a display assembly, according to an embodiment.

FIG. 1A is a schematic, front view of a display assembly, according to an embodiment, and FIG. 1B is an exploded, side view of a liquid crystal display assembly, according to an embodiment. Referring to FIG. 1A, a display assembly 100 comprises a base 110 and a monitor assembly 120 coupled to the base. Monitor assembly 120 comprises a housing 122, which houses a LCD assembly 150.

Referring to FIG. 1B, liquid crystal display assembly 150 comprises a controller 152, a memory module 154, a backlight assembly 160, a diffuser/polarizer 168, a liquid crystal (LC) module 170, and may include a light directing film 172. Display assembly 100 may be embodied as any type of color graphics display. In one embodiment, LC module 170 may comprise a thin film transistor (TFT) assembly. In other embodiments, the LC module 170 may embodied as a different type of LC, e.g., a diode matrix or another capacitively driven LC, a digital mirror assembly, or the like.

Backlight assembly 160 comprises one or more arrays of light emitting diodes (LEDs). In some embodiments the one or more arrays of light emitting diodes may include, e.g., an array of red LEDs 162, an array of green LEDs 164, and an array of blue LEDs 166. In some embodiments, backlight assembly 160 may include one or more reflecting cups 174 positioned adjacent a light emitting diode to reflect light from the diode toward a diffuser 168 positioned adjacent the backlight assembly 160. In some embodiments, diffuser 168 may also act as a polarizer to polarize light emitted by the arrays of LEDs 162, 164, 166.

In some embodiments the backlight assembly may implement alternate illumination techniques. For example, in some embodiments the backlight assembly 160 may include an array of white LEDs and one or more color filters to generate colors from the white light emitted by the LEDs. In alternate embodiments the backlight assembly 160 may include an array of blue LEDs accompanied by a diffusing layer and a photon conversion material to convert the blue light to shades of green and red. In still alternate embodiments the backlight assembly 160 may include LEDs that generate ultraviolet (UV) radiation and a filter assembly to shift the wavelength of the UV radiation to visible light of varying colors.

An LC module 170 is positioned adjacent diffuser 168. In some embodiments, LC module may be a twisted nematic LC, an in-plane switching LC, or a vertical alignment (VA) LC. In some embodiments, a light directing film 172 may be positioned adjacent the LC to enhance the brightness of the display.

In some embodiments, a light director 158 is disposed adjacent backlight assembly 160 to direct light emitted by the LED arrays 162, 164, 166 onto a detector 156. Like director 158 may be embodied as a focusing lens, a Fresnel lens, one or more mirrors, one or more light pipes, or a collector such as, for example, in integrating sphere. Detector 156 generates an electrical signal in response to a characteristic of the light incident upon the detector 156. For example, some embodiments detector one or 56 may be embodied as a photodiode, a quadrant detector, or another suitable optical detector.

Figures 2A, 2B:
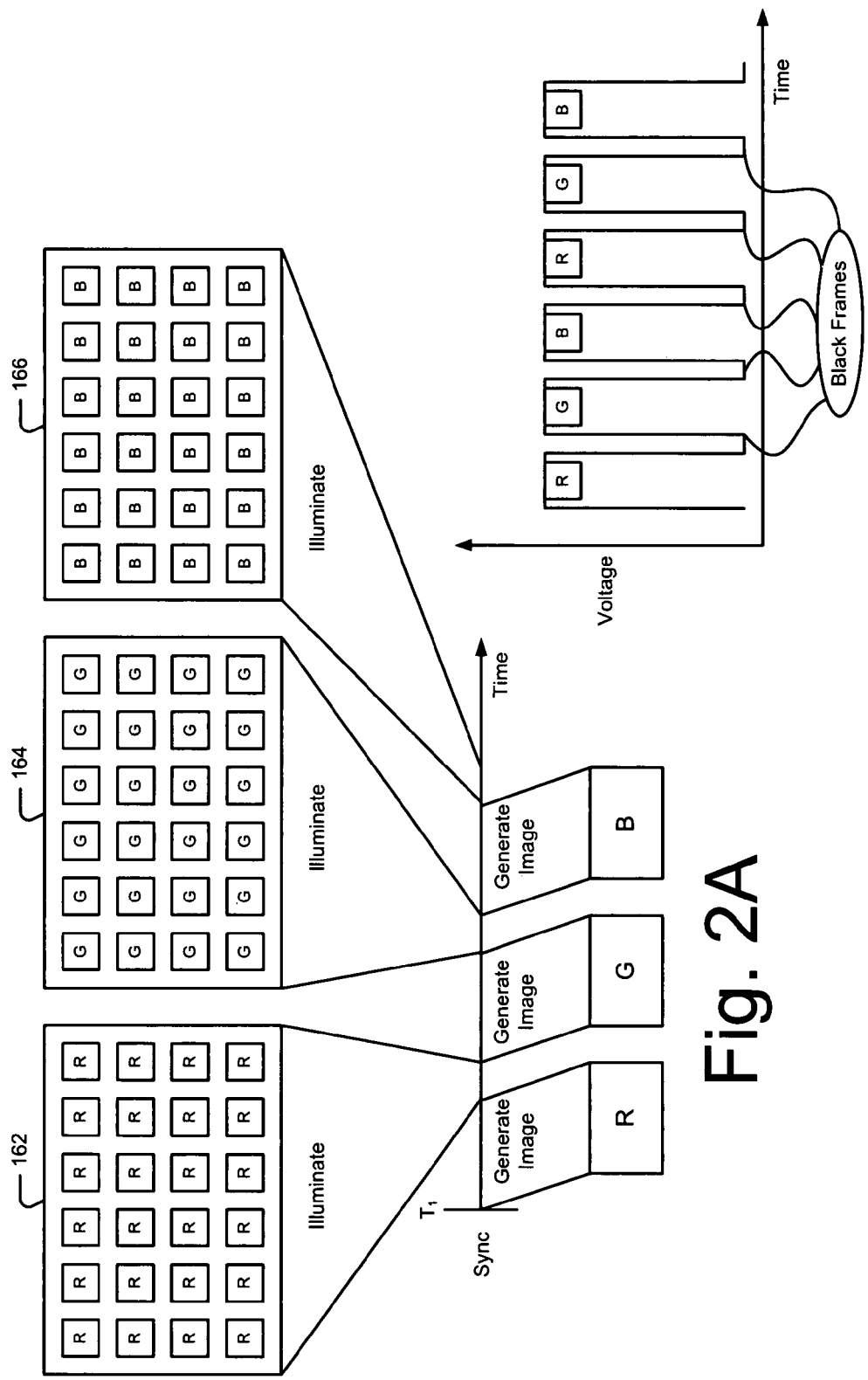
FIGS. 2A and 2B are schematic illustrations of an illumination timing sequence, according to embodiments.

In some embodiments, the LED arrays 162, 164, 166 may be illuminated in sequence to create a color image on LCD assembly 150. FIGS. 2A and 2B are schematic illustrations of an illumination timing sequence, according to embodiments. The timing sequence may be managed by the controller 152.

FIG. 2A illustrates a timing sequence for the presentation of a single color image on the LCD assembly 150. In the embodiment depicted in FIG. 2A, the timing controller implements a multi-step process to display a full-color image on the LCD assembly 150. The multi-step process successively generates a single color component image of a full-color image, then illuminates the screen with the color component. This process is repeated with each color component of a full-color image. When implemented at a sufficiently fast cycle rate, the successive single color component images appear as a full-color image.

Referring to FIG. 2A, initially the LCD assembly is synchronized at time $T_1$. A red component of a full-color image is generated on LCD assembly 150, and then the array of red LEDs 162 is illuminated. A green component of a full-color image is generated on LCD assembly 150, and then the array of green LEDs 164 is illuminated. Finally, a blue component of a full-color image is generated on LCD assembly 150, and then the array of blue LEDs 166 is illuminated. The combination of the red, green, and blue images generate a full color image on display assembly 150.

Many display assemblies operate using a 60 Hz image refresh rate. In some embodiments the controller 152 operates such that each refresh cycle is subdivided into (n+1) different cycles, where n corresponds to the number of component color images presented on the display assembly 150. For example, in an embodiment which uses red, green, and blue LEDs, the 60 Hz refresh rate may be divided into four different cycles. In some embodiments a white illumination cycle may be added to the backlight assembly, (e.g., by the addition of a white LED array or by the contemporaneous illumination of the red, green, and blue LED arrays) to increase the luminance of the screen, such that each refresh cycle is subdivided into five different cycles.

FIG. 2B illustrates a timing cycle of controller 152 in an embodiment that utilizes a three-cycle illumination scheme. Referring to FIG. 2B, after the initial synchronization period, a voltage is applied to the array of red LEDs 162, then the voltage is removed from array of red LEDs 162. A delay is introduced before a voltage is applied to the array of green LEDs 164. The voltage is maintained for a time period, then the voltage is removed from array of green LEDs 164. Another delay is introduced before a voltage is applied to the array of blue LEDs 166. The voltage is maintained for a time period, then the voltage is removed from array of blue LEDs 166. Another delay second is introduced before a voltage is applied to the array of red LEDs 162, and the cycle continues. Other embodiments of the display assembly may implement illumination timing sequences different from the sequences depicted in FIGS. 2A and 2B.

In some embodiments, a liquid crystal display assembly may implement techniques to compensate for changes in the optical characteristics of the light emitting diodes used as an illumination source in the display. For example, in some embodiments the display assembly may establish a baseline measurement for one or more optical characteristics of the light emitting diodes when the display assembly is properly calibrated. The optical characteristic measurements may be stored in a memory modules such as, for example, the memory 154. Subsequently, a recalibration routine may be implemented in which optical characteristic measurements are collected from the light emitting diodes and one or more operating parameters of the light emitting diodes may be adjusted based upon relationship between the optical characteristics collected during the initial baseline measurement and the subsequent recalibration measurement.

Figure 5:
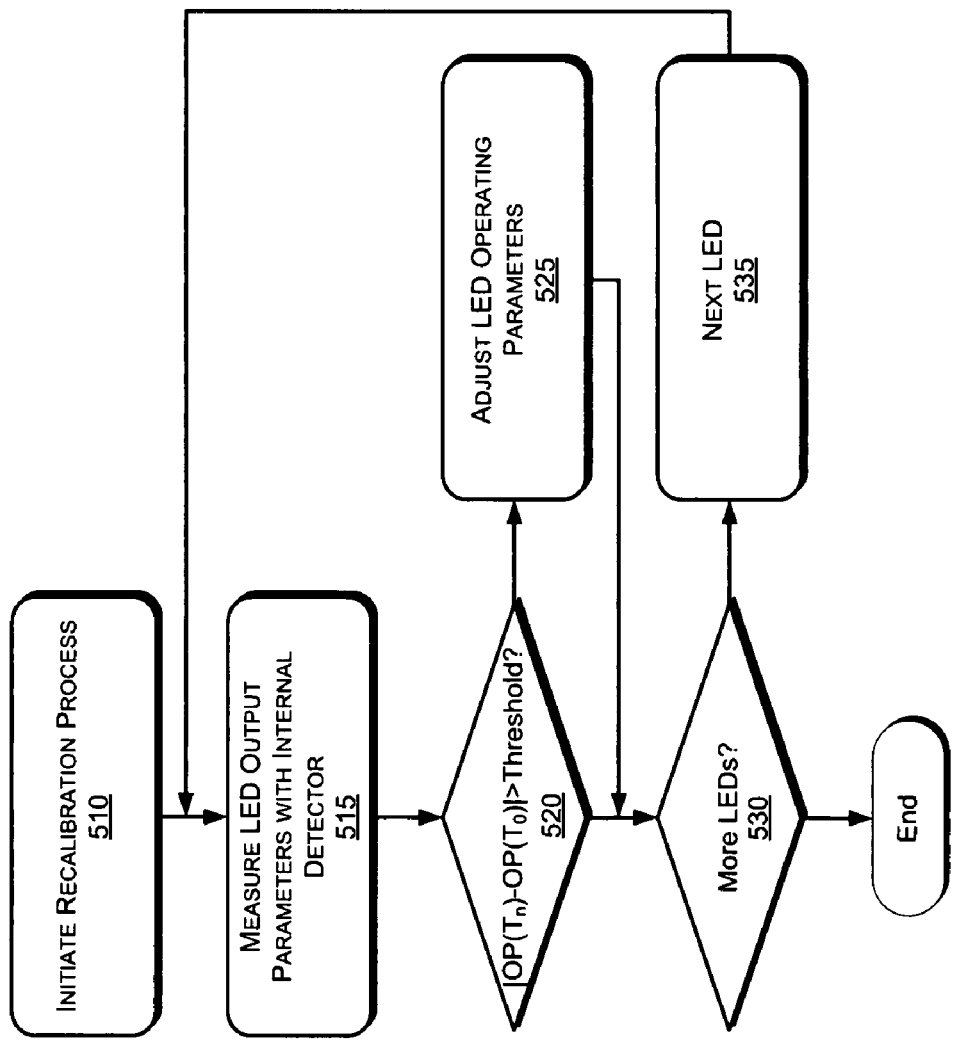
FIGS. 3 and 5 are flowcharts illustrating operations in embodiments of a method to operate a display.
Figure 3:
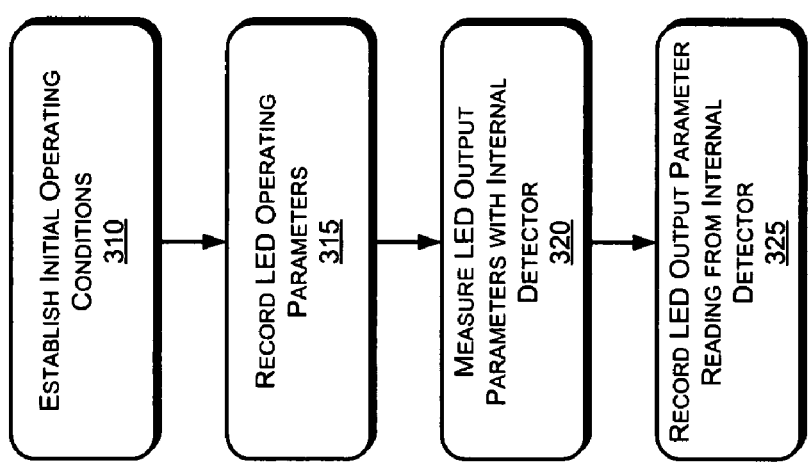

One example of such a technique is described with reference to FIGS. 3-5. FIGS. 3 and 5 are flowcharts illustrating operations in embodiments of a method to operate a display, and FIG. 4 is a schematic illustration of a data table, according to embodiments. In some embodiments, the operations depicted in FIGS. 3 and 5 may be implemented by the controller 152 and the data table depicted in FIG. 4 may be stored in the memory module 154.

Referring to FIG. 3, at operation 310 one or more initial operating conditions are established for the display assembly. For example, in some embodiments the display assembly may be calibrated by using a camera or charge coupled device (CCD) coupled to a computing device to view the display. One or more operating parameters associated with the light emitting diodes may be adjusted until the display assembly exhibits a desired color temperature (e.g., 6500K).

At operation 315, one or more of the operating parameters associated with the light emitting diodes are recorded. For example, in one embodiment the controller maintains a data table 400 (FIG. 4) in memory module 154. Referring to FIG. 4, the data table 400 may be organized as a series of columns and rows. The table 400 may include a row for each light emitting diode. In the embodiment depicted in FIG. 4, each light emitting diode may be uniquely identified by its Cartesian coordinate position (x,y) in the array of light emitting diodes.

In the embodiment depicted in FIG. 4 data table 400 includes an entry for the operating voltage of each light emitting diode. At operation 315 the operating voltage for a plurality of light emitting diodes, and in some embodiments for each light emitting diode, in the display is recorded in the data table 400.

At operation 320 an output parameter of one or more light emitting diodes is measured using an integrated detector, such as the detector 156. For example, in some embodiments each light emitting diode in the LCD assembly 150 is a separately addressable by the controller 152. During the initial calibration process depicted in FIG. 3, the controller may activate individual light emitting diodes, applying the voltage $V(T_0)$ depicted in FIG. 4 to the diode. At operation 325 an output parameter from the light emitting diode is recorded in the data table 400. For example, in some embodiments the detector 156 produces an output signal, such as an output voltage $VD(T_0)$ in response to an optical input from the light emitting diode. The output voltage associated with each light emitting diode when operated at the initial calibration voltage is recorded in the data table 400. Thus, the data table 400 provides a correlation between the driving voltage of each light emitting diode and an output signal generated by the detector 156 in response to the driving voltage.

FIG. 5 depicts operations in a process that may be used to recalibrate the liquid crystal display. At operation 510 the recalibration process is initiated. In some embodiments, the recalibration process may be initiated by a user through a user interface, such as, for example to a software interface or a hardware interface coupled to the liquid crystal display assembly 150. In other embodiments the recalibration process may be implemented periodically through time. In still other embodiments, the recalibration process may be implemented based on temperature variation in the region proximate the liquid crystal display assembly 150. For example, a thermocouple or other thermoelectric detection device may detect when a change in temperature in the liquid crystal device assembly exceeds a threshold and may trigger a recalibration process in response to the temperature change.

At operation 515 one or more output parameters associated with the light emitting diodes are measured using the integrated detector 156. As described above, in some embodiments each light emitting diode in the LCD assembly 150 is a separately addressable by the controller 152. During recalibration process depicted in FIG. 5, the controller may activate individual light emitting diodes, again applying the voltage $V(T_0)$ depicted in FIG. 4 to the diode. At operation 515 an output parameter from the light emitting diode is measured. For example, in some embodiments the detector 156 produces an output signal, such as an output voltage $VD(T_R)$ in response to an optical input from the light emitting diode. The output voltage associated with each light emitting diode when operated at the initial calibration voltage may be recorded in the data table 400.

If, at operation 520 the difference between the output parameter measured during the recalibration process and the output parameter measured during the initial calibration process exceeds a threshold and control passes to operation 525 and one or more operating parameters associated with the light emitting diode is adjusted. For example, using the embodiment depicted in FIG. 4, is the difference between the output detector voltage measured during the calibration process and the output detector voltage measured during the recalibration process exceeds a threshold than the operating voltage of the light emitting diode may be adjusted.

In some embodiments, the operating voltage may be adjusted as a function of a difference between the output voltage generated by the detector 156. For example, the operating voltage of the light emitting diode may be adjusted as by a factor of the ratio of the voltages measured during the initial calibration process and the recalibration process, respectively. Thus, $V_{new}=V(T_0)*(VD(T_0)/VD(T_R))$. In alternate embodiments a quadratic approximation technique may be applied.

If, at operation 530, they are more light emitting diodes to evaluate the control passes to operation 535 in the controller activates a next light emitting diode in the array. Control in passes back to operation 515 in the selected light emitting diode is evaluated. Thus, operations 515 through 535 may be repeated in a loop such that all light emitting diodes in the array, or a subset thereof, may be evaluated and if necessary adjusted during the recalibration process.

Figure 6:
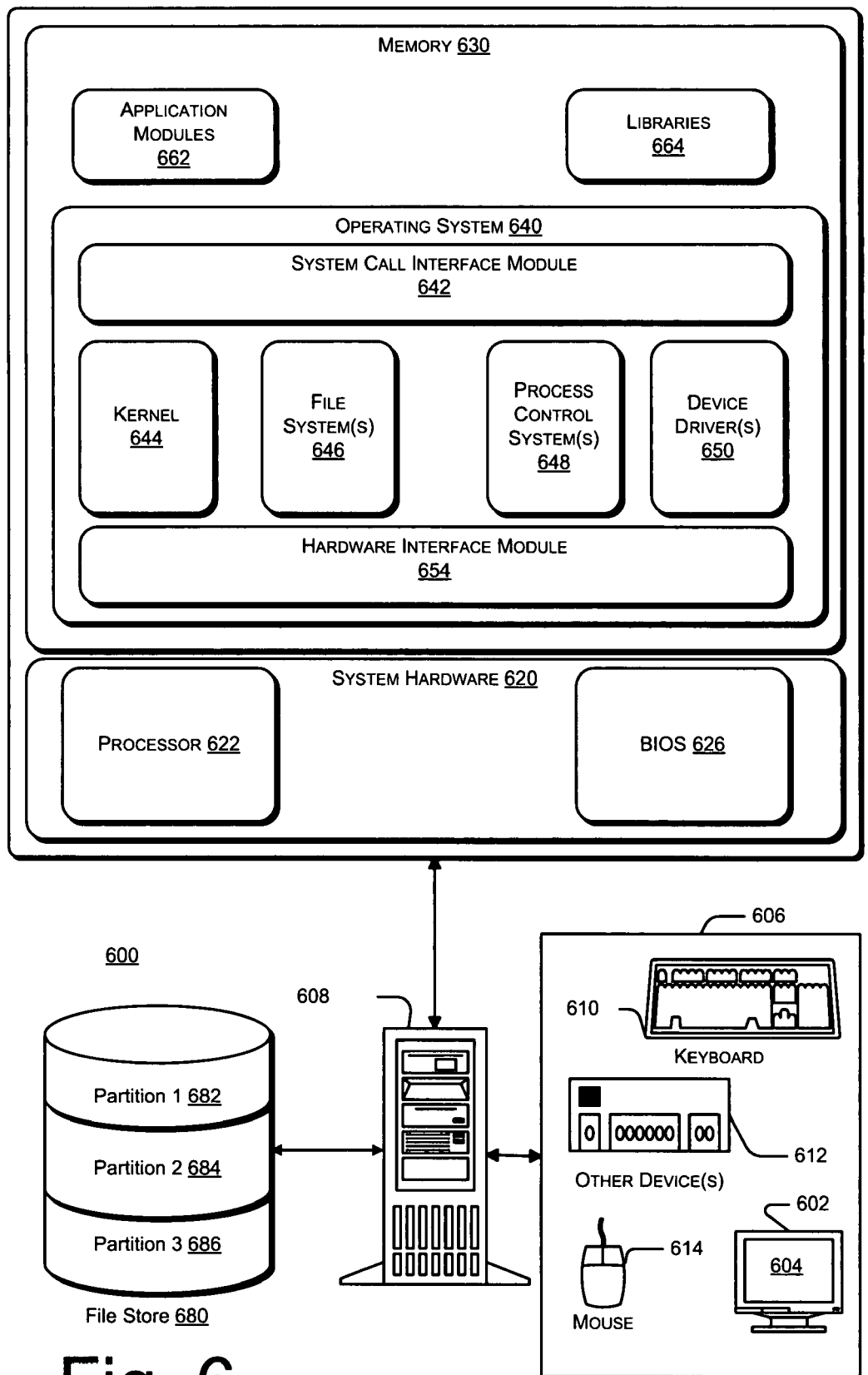
FIG. 6 is a schematic illustration of a computing system, according to an embodiment.

In some embodiments, a liquid crystal display assembly 150 may be distributed as a component of a computer system. FIG. 6 is a schematic illustration of a computing system, according to an embodiment. The components shown in FIG. 6 are only examples, and are not intended to suggest any limitation as to the scope of the functionality of the display assembly; the display assembly is not necessarily dependent on the features shown in FIG. 6. In the illustrated embodiment, computer system 600 may be embodied as a hand-held or stationary device for accessing the Internet, a desktop PCs, notebook computer, personal digital assistant, or any other processing devices that have a basic input/output system (BIOS) or equivalent.

The computing system 600 includes a computer 608 and one or more accompanying input/output devices 606 including a display 602 having a screen 604, a keyboard 610, other I/O device(s) 612, and a mouse 614. The other device(s) 612 may include, for example, a touch screen, a voice-activated input device, a track ball, and any other device that allows the system 600 to receive input from a developer and/or a user.

The computer 608 includes system hardware 620 commonly implemented on a motherboard and at least one auxiliary circuit boards. System hardware 620 including a processor 622 and a basic input/output system (BIOS) 626. BIOS 626 may be implemented in flash memory and may comprise logic operations to boot the computer device and a power-on self-test (POST) module for performing system initialization and tests. In operation, when activation of computing system 600 begins processor 622 accesses BIOS 626 and shadows the instructions of BIOS 626, such as power-on self-test module, into operating memory. Processor 622 then executes power-on self-test operations to implement POST processing.

Computer system 600 further includes a file store 680 communicatively connected to computer 608. File store 680 may be internal such as, e.g., one or more hard drives, or external such as, e.g., one or more external hard drives, network attached storage, or a separate storage network. In some embodiments, the file store 680 may include one or more partitions 682, 684, 686.

Memory 630 includes an operating system 640 for managing operations of computer 608. In one embodiment, operating system 640 includes a hardware interface module 654 that provides an interface to system hardware 620. In addition, operating system 640 includes a kernel 644, one or more file systems 646 that manage files used in the operation of computer 608 and a process control subsystem 648 that manages processes executing on computer 608. Operating system 640 further includes one or more device drivers 650 and a system call interface module 642 that provides an interface between the operating system 640 and one or more application modules 662 and/or libraries 664. The various device drivers 650 interface with and generally control the hardware installed in the computing system 600.

In operation, one or more application modules 662 and/or libraries 664 executing on computer 608 make calls to the system call interface module 642 to execute one or more commands on the computer's processor. The system call interface module 642 invokes the services of the file systems 646 to manage the files required by the command(s) and the process control subsystem 648 to manage the process required by the command(s). The file system(s) 646 and the process control subsystem 648, in turn, invoke the services of the hardware interface module 654 to interface with the system hardware 620. The operating system kernel 644 can be generally considered as one or more software modules that are responsible for performing many operating system functions.

The particular embodiment of operating system 640 is not critical to the subject matter described herein. Operating system 640 may be embodied as a UNIX operating system or any derivative thereof (e.g., Linux, Solaris, etc.) or as a Windows® brand operating system or another operating system.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A liquid crystal display assembly, comprising:
a liquid crystal module;
a backlight assembly comprising an array of light emitting diodes;
a detector to detect an optical output of at least one light emitting diode; and
a controller coupled to the detector;
wherein the controller comprises logic to:
record in a memory location a first output value from the detector at a first point in time for a plurality of light emitting diodes in the array of light emitting diodes;
measure a second output value from the detector at a second point in time for the plurality of light emitting diodes in the array of light emitting diodes;
determine a difference between the first output value from the detector at the first point in time and the second output value from the detector at the second point in time for the plurality of light emitting diodes in the array of light emitting diodes respectively; and
if the determined difference exceeds a threshold, adjust at least one input value to at east one light emitting diode of the plurality of light emitting diodes in the array of light emitting diodes based on a ratio of the first output value and the second output value.

2. The liquid crystal display assembly of claim 1, further comprising a light director to direct light from each light emitting diode in the plurality of light emitting diodes onto the detector.

3. The liquid crystal display assembly of claim 2, wherein:
the backlight assembly comprises at least one reflector cup to direct light from a light emitting diode in the array of light emitting diodes; and
the reflector cup comprises an aperture to permit a portion of the light emitted by the light emitting diode to escape toward the light director.

4. The liquid crystal display assembly of claim 2, wherein:
the liquid crystal display assembly further comprises a diffuser in an optical path between the backlight assembly and the liquid crystal module, and
a portion of the light incident on the diffuser is reflected toward the detector.

5. The liquid crystal display assembly of claim 1, wherein the controller includes logic to activate each light emitting diode in the array of light emitting diodes on an individual basis.

6. The liquid crystal display assembly of claim 1, wherein the controller initiates a recalibration routine in response to a change in temperature in the liquid crystal display assembly.

7. The liquid crystal display assembly of claim 1, wherein the controller comprises logic to adjust at least one input value to at least one light emitting diode of the plurality of light emitting diodes in the array of light emitting diodes based on the ratio of the first output value and the second output value by utilizing the following formula: $V_{NEW} = V(T_O) * VD(T_O)/VD(T_R))$, where $V_{NEW}$ represents the new input value, $V(T_O)$ represents the previous input value, $VD(T_O)$ represents the first output value at the first point in time, and $VD(T_R)$ represents the second output value at the second point in time.

8. A liquid crystal display assembly, comprising:
   a liquid crystal module;
   a backlight assembly comprising an array of light emitting diodes;
   a detector to detect an optical output of at least one light emitting diode; and
   a controller coupled to the detector wherein the controller comprises logic to:
      record in a memory location a first output value from the detector at a first point in time for a plurality of light emitting diodes in the array of light emitting diodes;
      detect a recalibration trigger event, wherein the recalibration trigger event comprises the receipt of one or more of a user-initiated recalibration command, a timer-initiated recalibration command, and a temperature change initiated recalibration command;
      in response to the recalibration trigger event, measure a second output value from the detector at a second point in time for the plurality of light emitting diodes in the array of light emitting diodes; and
      adjust at least one input value to the plurality of light emitting diodes based on a relationship between the first output value and the second output value.

9. The liquid crystal display assembly of claim 8, further comprising a light director to direct light from each light emitting diode in the plurality of light emitting diodes onto the detector.

10. The liquid crystal display assembly of claim 9, wherein:
   the backlight assembly comprises at least one reflector cup to direct light from a light emitting diode in the array of light emitting diodes; and
   the reflector cup comprises an aperture to permit a portion of the light emitted by the light emitting diode to escape toward the light director.

11. The liquid crystal display assembly of claim 9, wherein:
   the liquid crystal display assembly further comprises a diffuser in an optical path between the backlight assembly and the liquid crystal module, and
   a portion of the light incident on the diffuser is reflected toward the detector.

12. The liquid crystal display assembly of claim 8, wherein the controller includes logic to activate each light emitting diode in the array of light emitting diodes on an individual basis.

13. The liquid crystal display assembly of claim 8, wherein the controller includes logic to:
   determine a difference between a first output value from the detector at a first point in time and a second output value from the detector at a second point in time; and
   adjust at least one input value to at least one light emitting diode based on a ratio of the first output value and the second output value.

14. The liquid crystal display assembly of claim 8, wherein the temperature change initiated recalibration command is provided in response to detecting that a temperature change in at least a portion of the liquid crystal display assembly exceeds a threshold.

15. A display assembly, comprising:
   a liquid crystal module;
   a backlight assembly comprising an array of light emitting diodes;
   a detector to detect an optical output of at least one light emitting diode; and
   a controller coupled to the detector wherein the controller comprises logic to:
      record in a memory location a first output value from the detector at a first point in time for a plurality of light emitting diodes in the array of light emitting diodes;
      detect that a temperature change in at east a portion of the display assembly exceeds a threshold,
      in response to detecting that the temperature chance in at least a portion of the display assembly exceeds the threshold, measure a second output value from the detector at a second point in time for the plurality of light emitting diodes in the array of light emitting diodes; and
      adjust at least one input value to the plurality of light emitting diodes based on a relationship between the first output value and the second output value.

16. The display assembly of claim 15, wherein the display assembly further comprises a light director to direct light from each light emitting diode in the plurality of light emitting diodes onto the detector.

17. The display assembly of claim 16, wherein:
   the backlight assembly comprises at least one reflector cup to direct light from a light emitting diode in the array of light emitting diodes; and
   the reflector cup comprises an aperture to permit a portion of the light emitted by the light emitting diode to escape toward the light director.

18. The display assembly of claim 16, wherein:
   the display assembly further comprises a diffuser in an optical path between the backlight assembly and the liquid crystal module, and
   a portion of the light incident on the diffuser is reflected toward the detector.

19. The display assembly of claim 15, wherein the controller includes logic to activate each light emitting diode in the array of light emitting diodes on an individual basis.

20. The display assembly of claim 15, wherein the controller includes logic to:
   determine a difference between a first output value from the detector at a first point in time and a second output value from the detector at a second point in time; and
   adjust at least one input value to at least one light emitting diode based on a ratio of the first output value and the second output value.

* * * * *

UNITED STATES PATENT AND TRADEMARK OFFICE
CERTIFICATE OF CORRECTION

PATENT NO.         : 8,259,057 B2
APPLICATION NO.    : 11/888004
DATED              : September 4, 2012
INVENTOR(S)        : Mark Butterworth It is certified that error appears in the above-identified patent and that said Letters Patent is hereby corrected as shown below:

In column 6, line 30, in Claim 1, delete "detector;" and insert -- detector, --, therefor.

In column 6, line 46, in Claim 1, delete "east" and insert -- least --, therefor.

In column 7, line 15, in Claim 7, delete "*VD($T_o$)/" and insert -- *(VD($T_o$)/ --, therefor.

In column 8, line 25, in Claim 15, delete "east" and insert -- least --, therefor.

In column 8, line 26, in Claim 15, delete "threshold," and insert -- threshold; --, therefor.

In column 8, line 27, in Claim 15, delete "chance" and insert -- change --, therefor.

Signed and Sealed this
Nineteenth Day of March, 2013

Teresa Stanek Rea
*Acting Director of the United States Patent and Trademark Office*